(No Model.)
G. A. LAMBERT.
PLOW COLTER.
No. 509,383. Patented Nov. 28, 1893.
Fig. 1.
Fig. 2.
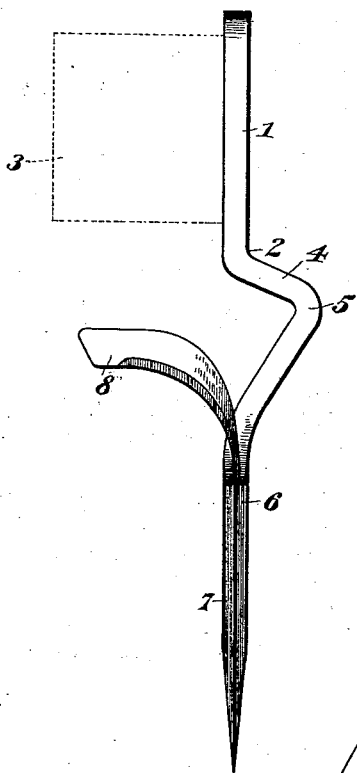
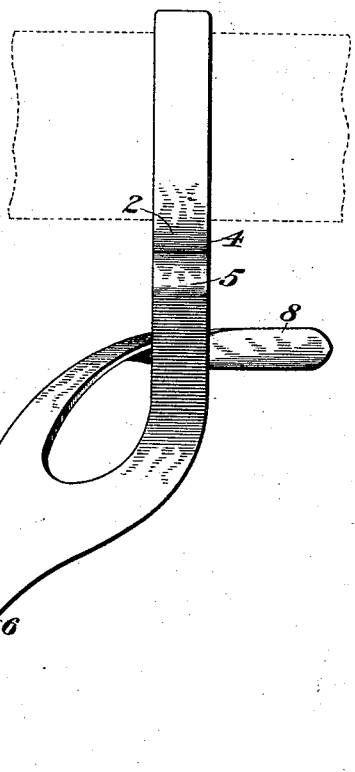
Witnesses:
J. M. Withurow
Is Thyers
Inventor,
G. A. Lambert.
By Hopkins & Atkins
Attorneys

UNITED STATES PATENT OFFICE.

GEORGE ALFRED LAMBERT, OF BELFAST, MAINE, ASSIGNOR TO ISAAC H. SHERMAN AND ELMER A. SHERMAN, OF SAME PLACE.

PLOW-COLTER.

SPECIFICATION forming part of Letters Patent No. 509,383, dated November 28, 1893.

Application filed January 26, 1893. Serial No. 459,847. (No model.)

*To all whom it may concern:*

Be it known that I, GEORGE ALFRED LAMBERT, of Belfast, county of Waldo, and State of Maine, have invented certain new and useful Improvements in Plow-Colters, of which the following is a specification, reference being had to the accompanying drawings.

The object of my invention is to produce an improved plow colter that is adapted, by its peculiar shape, to more readily clear itself in operation than those of other shapes now in use.

In the accompanying drawings, Figure 1 is a front elevation of my colter. Fig. 2 is a side view thereof.

In the accompanying drawings I have illustrated my improvement, which relates to the shank or stem of a colter, in combination with a colter blade of the kind shown in my Patent No. 483,457, issued September 27, 1892; but as my invention is perhaps applicable to other shapes of blades I do not wish to limit myself to this particular form of blade.

Referring to the figures on the drawings, 1 indicates the shank of my colter, which at 2, a little below its junction with the beam 3, it is bent abruptly to one side to form a short arm 4.

5 indicates a regular curve, from which proceeds the longer arm 6 that terminates in the line of the upper straight part, and which carries the colter blade 7.

8 indicates the wing of the colter, which, as shown in Fig. 2, swings from the opposite side of the blade at nearly the same angle as the arm 6, and in line with its junction with the blade.

By my invention the shank is removed from the line of cut of the blade, and every impediment to its clean cutting is removed.

What I claim is—

A colter having a shank provided with an angular lateral bend, a blade below the bend and in the same vertical plane as the shank, and a wing springing from the blade at substantially the same angle as the lower part of the bend of the shank and in line with its junction with the blade, substantially as and for the purpose specified.

In testimony of all which I have hereunto subscribed my name.

GEORGE ALFRED LAMBERT.

Witnesses:
EMERY BOARDMAN,
S. W. JOHNSON.